United States Patent
Amir et al.

(10) Patent No.: US 11,561,316 B2
(45) Date of Patent: Jan. 24, 2023

(54) MAGNETIC FIELD SENSOR FOR AN ACCESS POINT

(71) Applicant: Essence Security International (E.S.I.) Ltd., Herzliya Pituach (IL)

(72) Inventors: Ohad Amir, Herzlia Pituach (IL); Haim Amir, Herzlia (IL)

(73) Assignee: Essence Security International (E.S.I.) Ltd., Herzliya Pituach (IL)

( * ) Notice: Subject to any disclaimer, the term of this patent is extended or adjusted under 35 U.S.C. 154(b) by 0 days.

(21) Appl. No.: 17/666,002

(22) Filed: Feb. 7, 2022

(65) Prior Publication Data

US 2022/0163691 A1    May 26, 2022

Related U.S. Application Data

(63) Continuation of application No. 16/728,133, filed on Dec. 27, 2019, now Pat. No. 11,280,927.

(30) Foreign Application Priority Data

Dec. 31, 2018 (GB) ...................... 1821310

(51) Int. Cl.
   *G01V 3/08* (2006.01)
   *G08B 7/06* (2006.01)

(52) U.S. Cl.
   CPC ............... *G01V 3/08* (2013.01); *G08B 7/06* (2013.01)

(58) Field of Classification Search
   CPC .......... G01V 3/08; G08B 7/06; G08B 29/046; G08B 13/08
   See application file for complete search history.

(56) References Cited

U.S. PATENT DOCUMENTS

| | | | |
|---|---|---|---|
| 3,732,555 | A | 5/1973 | Strenglein |
| 5,233,323 | A | 8/1993 | Burkett et al. |
| 5,668,533 | A | 9/1997 | Jackson, Jr. et al. |
| 6,310,549 | B1 | 10/2001 | Loftin et al. |
| 8,350,650 | B2 | 1/2013 | Rajula |

(Continued)

FOREIGN PATENT DOCUMENTS

| | | |
|---|---|---|
| CN | 103456115 B | 7/2018 |
| EP | 2650848 A2 | 10/2013 |

(Continued)

OTHER PUBLICATIONS

"U.S. Appl. No. 16/728,133, Non Final Office Action dated Aug. 31, 2021", 14 pgs.

(Continued)

*Primary Examiner* — Farhana A Hoque
(74) *Attorney, Agent, or Firm* — Schwegman Lundberg & Woessner, P.A.

(57) ABSTRACT

A device may monitor an entry to or exit from a space via an access point. The entry access point has a first component and a second component that are separable from each other to create an opening for the entry or exit. The device may comprise a first part for mounting to one of said components and which has a processing component and a sensing component for sensing in multiple dimensions a magnetic field emanating from a second part mounted on the other of the first and second components. The processing component is configured: to receive an indication of the sensed magnetic field; detect a change of condition at the access point when a dynamic quality of the indication of the sensed magnetic field satisfies a predefined criterion; and output an indication of the detected change of condition. There may be a corresponding system, method and memory.

20 Claims, 8 Drawing Sheets

(56) References Cited

U.S. PATENT DOCUMENTS

| | | |
|---|---|---|
| 8,970,373 B2 | 3/2015 | Buckley et al. |
| 9,489,828 B2 | 11/2016 | Lamb et al. |
| 9,790,736 B2 | 10/2017 | Kincaid et al. |
| 2013/0265162 A1 | 10/2013 | Buckley et al. |
| 2015/0348385 A1 | 12/2015 | Lamb et al. |
| 2015/0355014 A1 | 12/2015 | Deak et al. |
| 2017/0038005 A1 | 2/2017 | Kraus et al. |
| 2017/0098356 A1 | 4/2017 | Dai et al. |
| 2017/0131356 A1 | 5/2017 | Boury |
| 2017/0227386 A1 | 8/2017 | Campero et al. |
| 2017/0356758 A1 | 12/2017 | Aylesbury et al. |
| 2018/0038159 A1 | 2/2018 | Kincaid et al. |
| 2020/0209420 A1 | 7/2020 | Amir et al. |

FOREIGN PATENT DOCUMENTS

| | | | |
|---|---|---|---|
| EP | 3249623 A1 * | 11/2017 | ............... G01D 5/14 |
| EP | 3509046 A1 | 7/2019 | |
| FR | 3016386 A1 | 7/2015 | |

OTHER PUBLICATIONS

"U.S. Appl. No. 16/728,133, Notice of Allowance dated Nov. 9, 2021", 10 pgs.

"U.S. Appl. No. 16/728,133, Response filed Oct. 25, 2021 to Non Final Office Action dated Aug. 31, 2021", 9 pgs.

"European Application Serial No. 19219922.2, Extended European Search Report dated Apr. 6, 2020", 9 pgs.

"United Kingdom Application Serial No. 18121310.8, Search Report dated Jun. 10, 2020", 3 pgs.

* cited by examiner

MAGNETIC FIELD SENSOR FOR AN ACCESS POINT

RELATED APPLICATIONS

This application is a continuation of U.S. patent application Ser. No. 16/728,133, filed Dec. 27, 2019, which claims the benefit of priority of UK Application Number 1821310.8, filed Dec. 31, 2018, which is hereby incorporated by reference in its entirety.

TECHNICAL FIELD

The present invention relates to a magnetic field sensor for an access point.

BACKGROUND

An entry point to an indoor or outdoor space may be provided via a door, gate or window. The entry point's state (open or closed) be may detected by a device installed on the entry point, the device having a magnetic part and a magnetic field sensing part, the respective parts being installed on different ones of an openable component (e.g. door/window/gate) of the entry point and a fixed component (e.g. a door/window frame or a gate post) of the entry point. However, such devices are subjectable to tampering attempts. For example, an intruder may place a magnetic of their own adjacent the magnetic sensor so that the magnetic sensor does not sense a magnetic field absence when the entry point is opened, and thus does not detect that the state of the entry point has changed from closed to opened. While various solutions have been attempted to solve this and other tampering threats, there continues to be a need for solutions to such and other problems of the prior art, including susceptibility to other tampering methods, or to provide a market alternative.

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

DETAILED DESCRIPTION OF THE EMBODIMENTS

Figure 1:
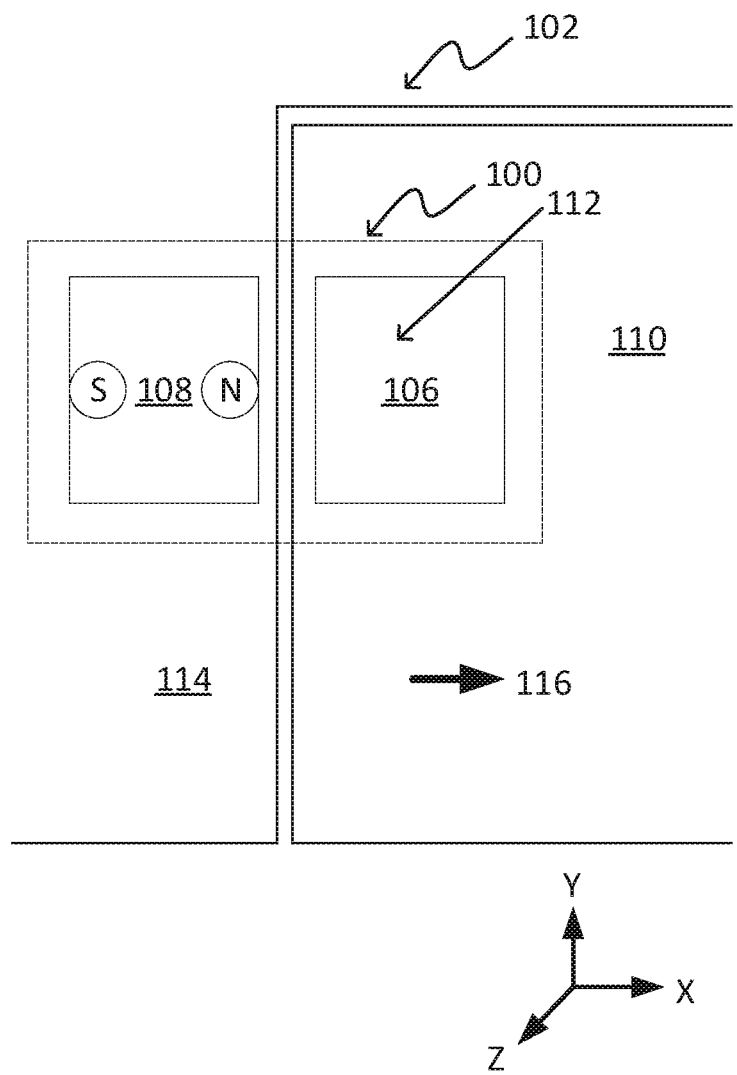
FIG. 1 is a conceptual illustration of an exemplary sensor system of one or more embodiments of the invention, installed on an exemplary access point.

Various embodiments of the invention are set out in the claims at the end of this specification. Further aspects of the present invention and further embodiments of the aspects described in the preceding paragraphs will become apparent from the appended figures and the following description, given by way of non-limiting example only. As will be appreciated, other embodiments are also possible and are within the scope of the claims.

A first aspect of the present invention provides a device for monitoring an entry to or exit from a space via an access point, the entry access point having a first component and a second component that are separable from each other to create an opening for the entry or exit, the device comprising:

a first part for mounting to one of first component and the second component, the first part having:
  a sensing component for sensing in multiple dimensions a magnetic field emanating from a second part mounted on the other of the first component and the second component, and
  a processing component configured to:
    receive an indication of the sensed magnetic field;
    detect a change of condition at the access point when a dynamic quality of the indication of the sensed magnetic field satisfies a predefined criterion; and
    output an indication of the detected change of condition.

By detecting a change of condition/state based on a dynamic quality of the indication of the sensed magnetic field, the device operate may operate without having to calibrate for different or changed installations. In other words, the device may operate with indifference to the actual/absolute magnitude of the magnetic field received by the sensing component in any of the dimensions. Further, by sensing the magnetic field in multiple dimensions as opposed to a single dimension there may be, in some embodiments, even greater flexibility in installation by allowing different installation orientations of the first part with respect to the second part, and/or may allow for greater sensitivity in detecting a change of condition, as approaches of a tamper magnet from any direction may be detected. In some embodiments, the multiple dimensions may more specifically be at least 3 dimensions, or more yet specifically be 3 dimensions in some embodiments. The 3 dimensions is in some embodiments are 3 Cartesian dimensions.

It is also beneficial to minimize or reduce the number inconsequential (i.e. false alarm) output events from the device, as each output event consumes power. Thus, appropriate settings of various detection thresholds is important and may benefit from being based on a dynamic aspect of the sensed magnetic field.

In some embodiments outputting an indication of the detected change of condition comprises instructing a transmission component to transmit an indication of the detected change of condition, for example to a control panel, which may optionally treat the indication as an alert. Outputting an indication of the detected change of condition may additionally or alternatively comprise an audible and/or visible output such as an alarm sound and/or a light emission.

In some embodiments, detecting that a dynamic quality satisfies the predefined criterion comprises: comparing a first value representing an amount or rate of a relatively slower magnetic field change with a first threshold and comparing a second value representing an amount or rate of a relatively quicker magnetic field change with a second threshold, and a dynamic quality is detected as satisfying the predefined criterion when at least one of the first value is greater than the first threshold and the second value is greater than the second threshold. In the context of thresholds as used herein, the term 'greater' is to be understood to mean having a greater magnitude than the threshold, so for example, a negative change would need to be more negative than a negative threshold to be greater than the threshold. Also, as used herein, 'slow', 'relatively slower' or 'relatively slow' and 'quick', 'relatively quicker' or 'relatively quick' may be understood to be slower and quicker relative to each other. Advantageously, both relatively slow and relatively quick approaches of a tamper magnet may be detected, making it difficult for a potential intruder to avoid tamper detection.

In some embodiments, detecting that a dynamic quality satisfies the predefined criterion comprises a first comparison, with respect to a first threshold, of a first dynamic quality that represents a first measure of change with respect to time.

In some embodiments, the first measure of change with respect to time is an amount of change of the sensed magnetic field over a first duration of time.

In some embodiments, first measure of change with respect to time is a rate or amount of change of a first spectral portion of the indication of the magnetic field in a frequency domain. As will be appreciated the magnetic field need not actually be physically represented in a frequency domain (by a processor) in order to calculate the first measure of change.

The first spectral portion of the magnetic field in a frequency domain may, for example, be derived from a filter that acts as at least one of a high pass (eg. AC coupled) or and a band pass filter.

In some embodiments, the first spectral portion of the magnetic field in a frequency domain may be derived digitally, e.g. based on one or more components of a Fourier transform of the indication of the sensed magnetic field, or by an analog circuit, e.g, based on an output of a differentiating amplifier.

In some embodiments, detecting that a dynamic quality satisfies the predefined criterion comprises a second comparison, with respect to a second threshold, of a second dynamic quality that represents an second measure of change with respect to time.

In some embodiments the first measure of change with respect to time is an amount of change of the sensed magnetic field over a first duration of time; and the second measure of change with respect to time is an amount of change of the sensed magnetic field over a second duration of time that is different to the first duration of time.

Optionally, the amount of change of the sensed magnetic field over the second duration of time may be represented as an accumulated change over the second duration of time or as an average change over a plurality of instances of a smaller duration of time within the second duration of time. The smaller duration of time may, for example, the first duration of time.

In some embodiments, second measure of change with respect to time is a rate or amount of change of a second spectral portion of the indication of the magnetic field in a frequency domain, wherein the first spectral portion of the magnetic field in a frequency domain includes a lower frequency portion of the magnetic field than the second spectral portion.

For example, the second spectral portion of the magnetic field in a frequency domain may be derived from a filter that acts as at least one of a high pass or and a band pass filter having a lower frequency cutoff that is at a higher frequency cutoff of the first spectral portion.

In some embodiments, the first and second thresholds are different. In some embodiments, the first and second thresholds are the same.

In some embodiments the predefined condition is that any one of the comparisons passes a test, for example that the representation of the amount of change of the sensed magnetic field has is greater than the threshold (e.g, the first or second threshold, whichever is relevant).

Preferably the sensing component is a solid-state magnetometer, for example a hall-effect based sensor, or any other solid-state magnetometer.

In some embodiments, the at least one dynamic quality of the sense magnetic field is a dynamic quality in any one of the multiple dimensions.

In some embodiments, the at least one dynamic quality of the sense magnetic field is a dynamic quality in more than one of the multiple dimensions.

In some embodiments, the at least one dynamic quality of the sense magnetic field is a dynamic quality in all of the multiple dimensions.

In some embodiments, the multiple dimensions comprise three dimensions.

In some embodiments, the multiple dimensions consist of three dimensions.

Conveniently, in some embodiments, the multiple dimensions are cartesian dimensions represented by cartesian coordinate system. Thus, the thresholds, may be thresholds on x, y, z axes. In other embodiments, the multiple dimensions may be represented by a spherical or cylindrical coordinate system, with the thresholds in the corresponding axes of those coordinate systems.

A second aspect of the present invention provides a sensor system for detecting an intrusion attempt at an entry point to a space, the system comprising: the device the first aspect of the present invention; and said second part.

A third aspect of the present invention provides a method for monitoring an entry to or exit from a space via an access point, the entry access point having a first component and a second component that are separable from each other to create an opening for the entry or exit, wherein a first part is mounting to one of the first component and the second component, the first part having a sensing component for sensing in multiple dimensions a magnetic field emanating from a second part mounted on the other of the first component and the second component, wherein the method comprises:

receiving an indication of the sensed magnetic field;

detecting a change of condition at the access point when a dynamic quality of the indication of the sensed magnetic field satisfies a predefined criterion; and outputting an indication of the detected change of condition.

As will be appreciated, each step executed by the device of the first aspect of the present invention may also be steps of the third aspect of the present invention.

A fourth aspect of the present invention provides a non-transient memory for storing code for execution by a processing system wherein upon executing the code the processing system is configured to perform the method of the third aspect of invention.

An exemplary sensor system 100 in accordance with an embodiment of the present invention is depicted schematically in FIG. 1, showing the sensor system 100 installed at an access point 102 to a space 104. The sensor system 100 comprises a device 106 which is a first part of the sensor system 100 and a physically separate part 108 which is a second part of the sensor system 100. In this example, the first part 106 is installed on a first component 110 of the access point 102, at a location 112 adjacent the second part 108, which is installed on a second component 114 of the access point 102, the first and second components being separable from each other to create an opening for entering or exiting the space 104 via the access point 102. In the illustrated embodiment the first component is a door, and the second component is a door frame, but in other embodiments the first component may be the door frame and second component may be the door, or the access point may be a window access point with the first and second components being a window and a window frame or a gate access point with the first and second components being a gate and either a gate post or another gate, for example. In the illustrated example the access point opens by the first component sliding in a direction 116 away from the second component, resulting in a corresponding movement of the first part 106 away from the second part 108. In this example the movement of the first component 110 away from the second component 114 is in a single linear axis, which is in the an 'x' axis in the figure. However, in other embodiments, the other directions of movement may be involved. For example, the first components 110 may be a hinged component, which rotated on the hinge to open the access point 102, for example resulting initially in a movement perpendicular the page (along the 'z' axis) before movement along the x axis becomes noticeable. As will be appreciated, other opening paths are possible for other access point configurations to which the present invention may be applied. For example, some access points configured to be opened by moving either one or both of the first or second components.

The first part of the system 100, i.e. the device 106, senses a magnetic field in 3 dimensions, e.g. the x, y and z dimensions, at its installation location 112. The second part 108 of the system 100 comprises a magnet that emanates a magnetic field with magnetic north and south poles, marked N and S in the figure, which is sensed by the device 106 when the access point 102 is closed enough for the magnetic field from the second part 108 to be fall within the sensitivity threshold of the device 106. When the access point is sufficiently open the sensed magnetic field drops below a threshold value (the threshold value being greater than the sensitivity threshold), the device 100 may determine that the access point is open, or at least that a change of state (i.e, condition) of has occurred.

A potential intruder may attempt to tamper with the system 100 to avoid detection by placing a tamper magnet adjacent the device 106 in the same or similar relative disposition to the device 106 as the second part 108. In doing so, the intention of the intruder is to keep the magnetic field sensed by the device 106 above the threshold value, while the access point 102 is opened, so that no door open event is detected.

Such a tamper attempt may however result in an increase in magnetic field at the device 106 which could be detected by the device to thereby identify that a magnetic tamper has, or may have, occurred. One option to have sensitive detection of the door no longer being in the closed, non-tampered state is to calibrate the device 106 to place relatively close thresholds above and below the 'normal' magnetic field magnitude, i.e. the field that exists in the non-tampered closed-access point state. However, such calibration may be laborious or done incorrectly by the installer. Further, the normal magnetic field may change with time, for example due to deterioration of how well the two components 110 and 114 of the access point 102 fit together when the access point 102 is closed.

However, the device 106 is provided with some ability to detect a change of state of the magnetic field at the location 112 of the device 106 with indifference to actual magnetic of the magnetic field in the normal (door closed non-tamper) state by detecting a change of condition at the access point based on a dynamic quality of the sensed magnetic field. Further, the exemplary device 106 senses the magnetic field in 3 dimensions to detect a change of condition when a tamper magnetic approaches the device 106 from any direction. Further, the dynamic quality of the magnetic field may be simultaneously assessed in a plurality of ways to identify relatively slow magnetic field changes and relatively quick magnetic field changes, distinctly from each other, and optionally identify one or more speeds of change in-between these two (fast and slow) extremes.

Figure 2:
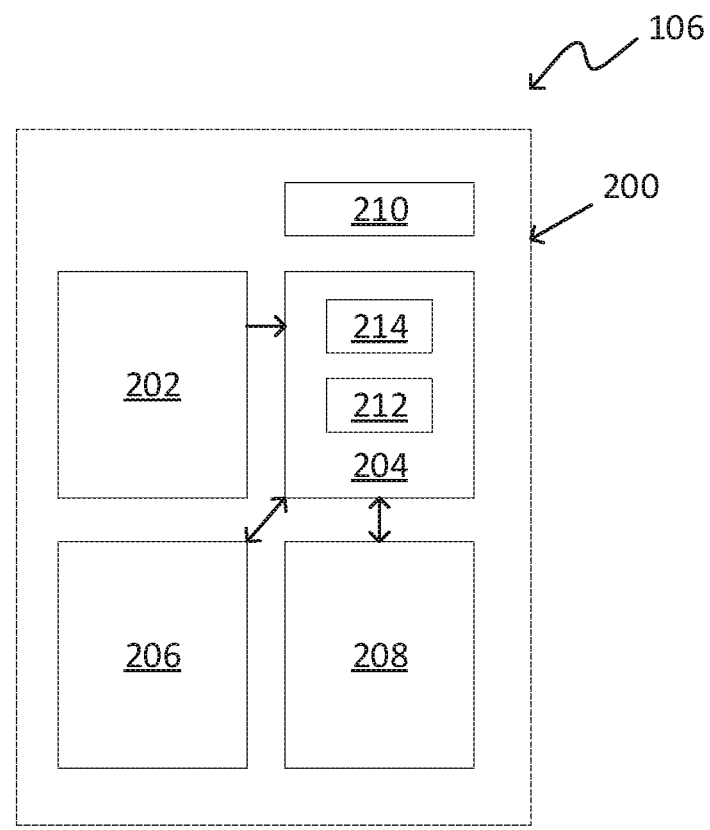
FIG. 2 is a block diagram showing principal components of a device that is a part of the sensor system of FIG. 1.

A block diagram showing an example of components that may be used for the device 106 is illustrated in FIG. 2. The device 106 has a housing 200 with an adhesive for mounting the housing to one of the components of the access point. Inside the housing 200 are a sensing component 202, a processing component 204 a memory component 206 and an outputting component 208. The term 'component' in the context may be one device, a part or one device, or a plurality of devices. Thus, in some embodiments, one or more of the components 202-208 may be integrated onto a common device, for an example an integrated circuit. In any case, the processing component 204 may be comprised of one or more processing chips. The processing component 204 may include one or more processing devices. For example, the one or more processing devices may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), and/or transceiver(s) to perform the methods.

At least one memory component 206 may be separate from the processor(s) and/or partly or wholly integrated onto a common chip(s) with the processor(s). The at least one memory may store code that, when read by the processor(s), causes performance of any of the methods described herein, and/or as illustrated in in the drawings. For example, the memory may comprise: volatile memory, for example, one or more dynamic random access (DRAM) modules and/or static random access memory (SRAM) modules; and/or non-volatile memory, for example, one or more read only memory (ROM) modules; which for example may comprise a Flash memory and/or other electrically erasable programmable read-only memory (EEPROM) device. The code may for example be software, firmware, or hardware description language (HDL) or may be any combination of these or any other form of code for one or more processors that is known by a person skilled in the art.

The device is also powered by a battery 210 held within the housing 200 of the device.

The processing component 204 may have a Central Processing Unit (CPU) 122 for performing high level control of the operation of the device 106 and interfacing the memory component 204, the output component 208, and a dynamic feature extraction component 214 having analog and digital circuitry for receiving an indication of a sensed magnetic field from the sensing component 202. The CPU may, in some embodiments, also receive the raw indication of the sensed magnetic field from the sensing component 202. The processing component 204 may instruct the output component 208, which may comprise a transceiver, to wirelessly transmit data, for example data identifying a detected change of condition of the sensed magnetic field, to a control panel (not shown). The transceiver may also act as an input component for updating the code in the memory component 206, from a remote storage of the code, e.g. via the control panel or a remote server. The output component may also include a speaker and/or visual indicator(s) e.g. LED(s) to provide an audio and/or visual indication of a detected change of condition of the sensed magnetic field.

The sensing component 202 may be a solid-state magnetometer for sensing magnetic field in three dimensions. The magnetometer may be a single device or mar be comprised of a plurality of devices configured to sense magnetic fields in orthogonal directions. In any case, the sensing component 202 may output an indication of the sensed magnetic field as magnitudes, proportional to magnetic field strength or intensity, in the respective dimensions.

The processing component 204 may include, between the sensing component 202 and a central processing unit (CPU) 212, or integrated into a CPU, a dynamic feature extraction component 214 for extracting one or more dynamic qualities of the indication of the sensed magnetic field received from the sensing component 202. The dynamic feature extraction component may extract relatively slow magnetic field changes distinctly from relatively quick magnetic field changes to assess separately to detect slow and fast magnetic field changes.

More specifically in some embodiments, the dynamic feature extraction component 214 may include an analog circuit and/or digital processing to extract the dynamic quality by AC coupling the sensed magnetic field. An example is discussed herein in relation to FIG. 4. As will be understood, the AC coupling is effectively a high pass filter. However, the dynamic feature extraction component 214 may include a plurality of filters and/or may provide band pass filtering (i.e. in effect, combining the low pass filter with a high pass filter) to extract various portions of the frequency spectrum, e.g. a low and high frequency portion of the spectrum, for example as will be discussed herein in relation to FIGS. 5 and 6, respectively. The low and high frequency component extraction may be provided for example by differentiating amplifier circuits, or may be done digitally (by a Fourier transform or other known methods), or any other way known in the art. Optionally a change of condition may be determined to have occurred when an amount of change of a frequency component is greater than a threshold.

In other embodiments, the extracted dynamic component may be a rate of change of a dynamic component of the magnetic field. For example, the sensed magnetic field may be differentiated (e.g. as will be discussed in relation to FIG. 7), optionally with low and frequency components separated from each other (FIGS. 8 and 9). For example, in an analog realm this may involve the use of differentiating amplifiers configured for extracting different components (portions) of frequency spectrum.

In any case, in some embodiments, an extracted portion of the frequency spectrum may have a lower end of a frequency range at or below 100 millihertz (for example a low frequency cut-off at 100 millihertz). In other embodiments, where the extracted portion of the frequency spectrum has a relatively low frequency portion and a relative high frequency portion, the relatively low frequency portion may range from at or below 100 millihertz to between 1 and 10 about Hz, for example the range may be from 100 millihertz to 10 Hz. The relatively high frequency portion may have a lower end of a frequency range that corresponds to (e.g. matches) an upper end of a frequency range of the relatively low frequency portion. For example, the lower end of the relatively high frequency portion may be between 1 and 10 hertz, and in some embodiments more specifically 10 hertz. An upper end of the high frequency portion may be defined by a sampling rate of the magnetic sensor or controller. In some embodiments the upper end may be 100 to 200 hertz, e.g. 100 hertz in some embodiments.

In other embodiments, the dynamic feature extraction component 214 may include a plurality of sample and hold circuits sampling at different frequencies which may be used by the CPU to identify changes in magnetic field over different durations of time, as will be discussed in relation to FIG. 10 to FIG. 12. As an alternative to using different sampling frequencies, an output of an analog to digital converter may be resampled, in the dynamic feature extraction component 214 (especially in some digitally implemented embodiments), at a slower rate to identify changes in magnetic field over a longer duration of time. The shorter and longer durations of time with which magnetic field changes are assessed may be have the same starting time or may have different starting times. The durations of time may be predefined. Further changes may be assessed continuously using successive contiguous windows (by analyzing a series of X millisecond windows that start every X milliseconds) or a sliding window (by analyzing a series of X millisecond windows that start every X/Y milliseconds, where Y is greater than 1). As will be appreciated the dynamic qualities of the sensed magnetic field may be extracted and/or characterized in any other way known to the person skilled in the art, and this may be done for analysis of relatively slow magnetic field changes distinctly from relatively quick magnetic field changes, and optionally one or more speeds of change in-between these two extremes.

Figure 5:
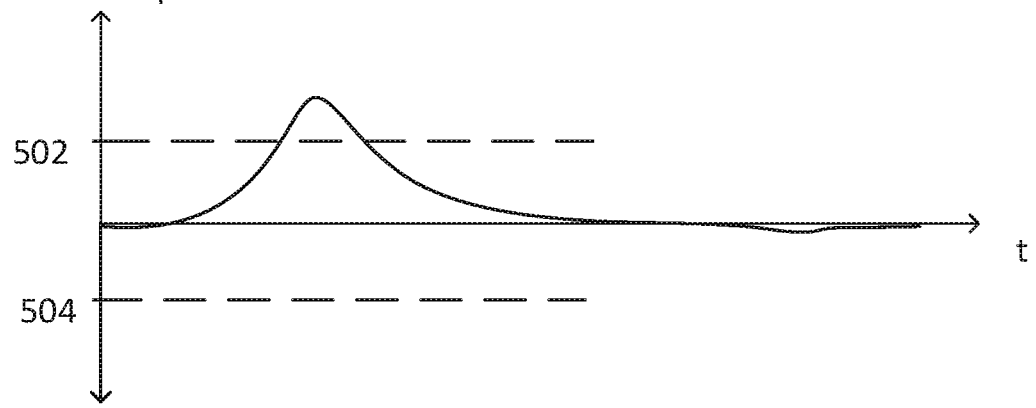
FIG. 5 is a graph showing a low frequency portion of the dynamic component of FIG. 4, compared with thresholds, according to one or more embodiments of the invention.
Figure 6:
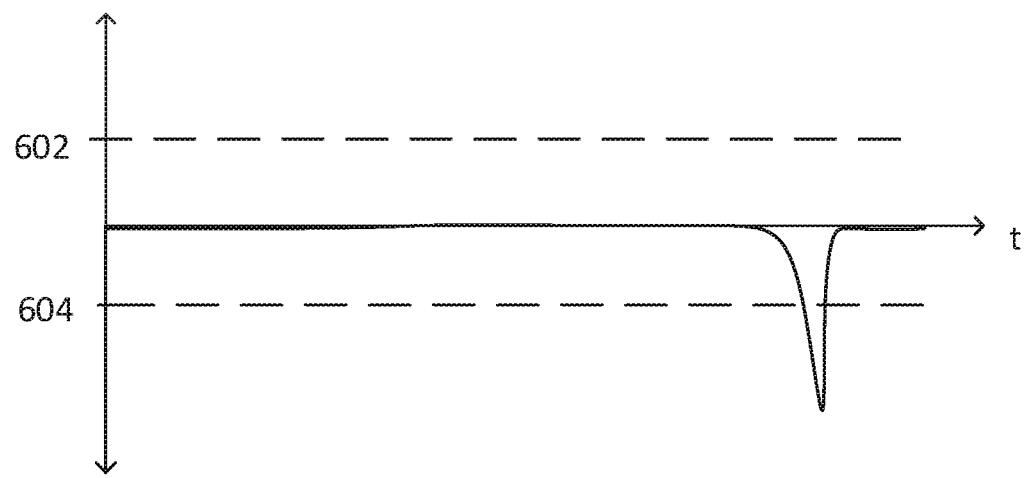
FIG. 6 is a graph showing a high frequency portion of the dynamic component of FIG. 4, compared with thresholds, according to one or more embodiments of the invention.

The extracted features are compared with various thresholds by the CPU 212 or some other processing component prior to processing by the CPU 212. In some embodiments, for each dimension, a relatively low frequency component of the sensed magnet field is continuously compared with a positive and a negative threshold, which may be the same or different to each other, and in some embodiments, a relatively high frequency component of the sensed magnet field is continuously compared with a positive and a negative threshold, which may be the same or different to each other, and may be the same or different to the thresholds used for the relatively low frequency component. An indication of a change of state is outputted by output component 208 when any one of the extracted frequency components has a value outside of the bounds set by the positive and lower thresholds. An example of such an embodiment is depicted in FIGS. 5 and 6. In other embodiments, the rate of change of the extracted frequency component(s) may be compared with the thresholds to determine whether a change of condition has occurred. Examples of such an embodiment is illustrated in FIGS. 8 and 9, and in FIGS. 10 to 12, the latter of which depicts an amount of change of various durations of time. The CPU 204 may be configured to indicate a change of condition when such a change of condition is detected in any one of measured the dimensions.

Figure 3:
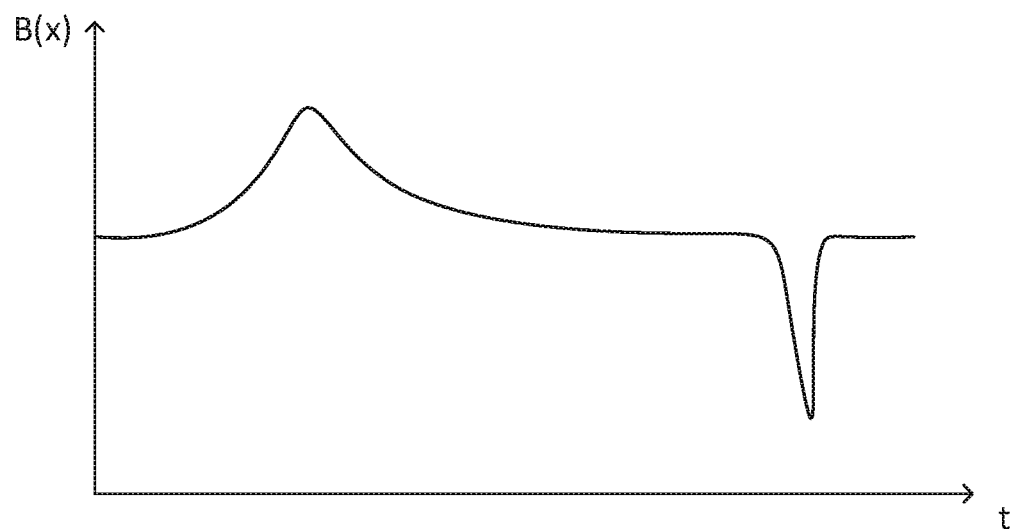
FIG. 3 is a graphical representation of a component of an exemplary magnetic field against time, sensed by the device of FIG. 2.
Figure 4:
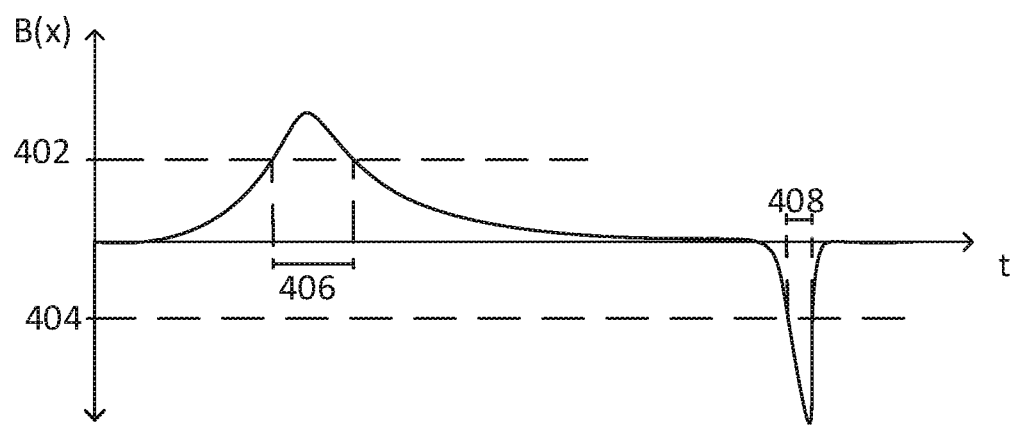
FIG. 4 is a graph showing a filtered output of the sensed magnetic field of FIG. 3 showing a dynamic component of the sensed magnetic field, compared with thresholds, according to one or more embodiments of the invention.

FIGS. 3 to 10 will now be discussed in greater detail. FIG. 3 illustrates an exemplary sensed magnetic field over a period of time, in an x direction. The magnetic field in this example may be either the all of the magnetic field (if is all in the x direction) or may be a component of the magnetic that is in the x direction. In FIG. 4 the feature extraction component 214 is AC coupled, or in any other known way filtered to remove the sensed magnetic bias. The processing component 204 then compare the filtered output to positive and negative thresholds 402 and 404 respectively to identify when the filtered magnetic field is greater than either of the components, which in this example occurs during time intervals 406 and 408, respectively. A change of state may be indicated to identify the events corresponding to the time intervals 406 and 408, and optionally may transmit the duration of the respective time intervals 406 and 408 as further information.

In the exemplary embodiment depicted in FIGS. 5 and 6, the dynamic component is separated, before or after the magnetic bias removal, into low and high frequency components, respectively. Each of the frequency components is compared with positive thresholds 502, 602 and negative thresholds 504, 604. The positive threshold for a given frequency component may be of the same or different magnitude to the negative threshold for the same frequency component. Further the thresholds may be different for the different frequency components to allow for different sensitivities to different frequencies of magnetic change.

Figure 7:
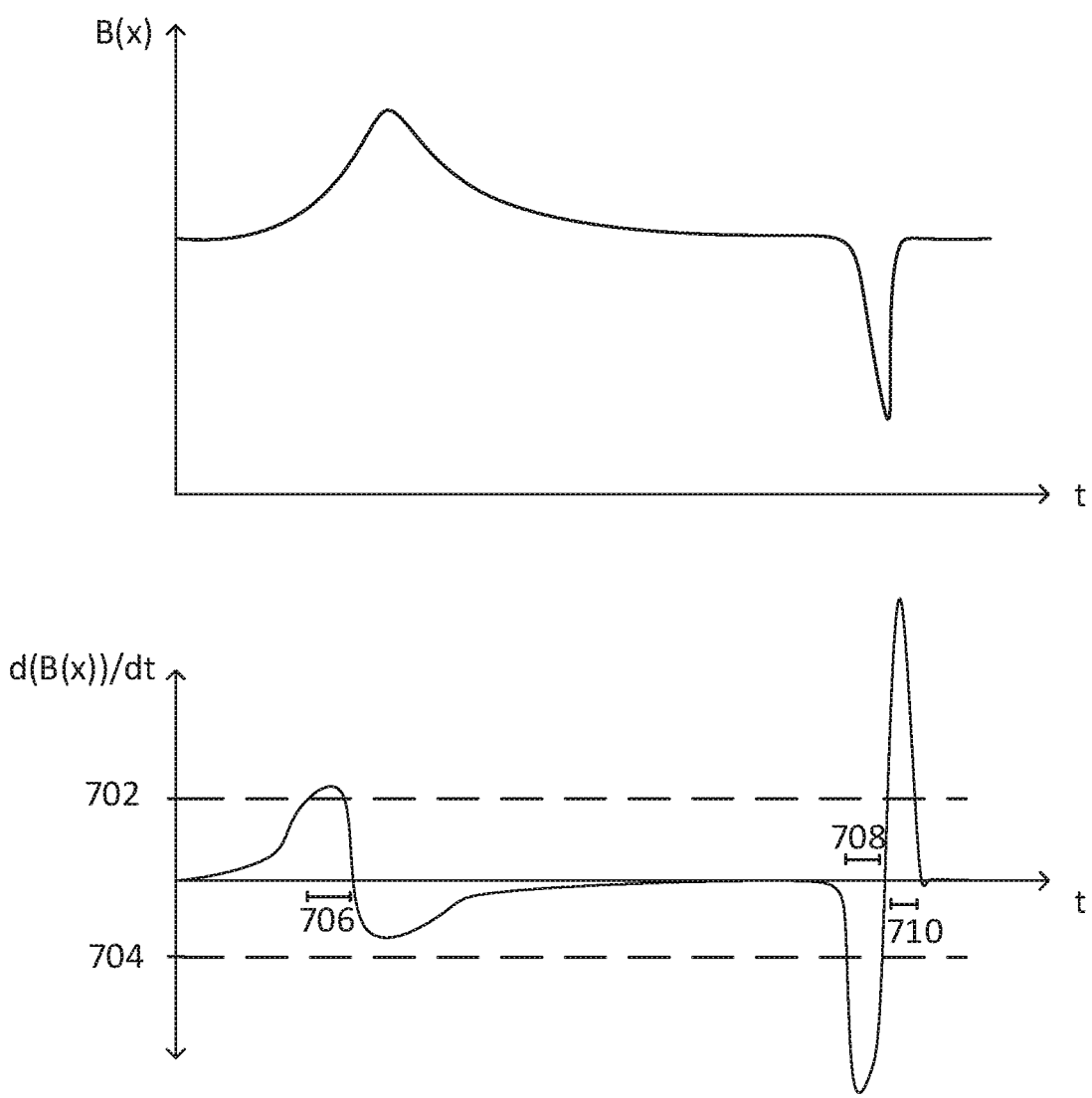
FIG. 7 is a graph showing a differential of the sensed magnetic field of FIG. 3, compared with thresholds, according to one or more embodiments of the invention.
Figure 8:
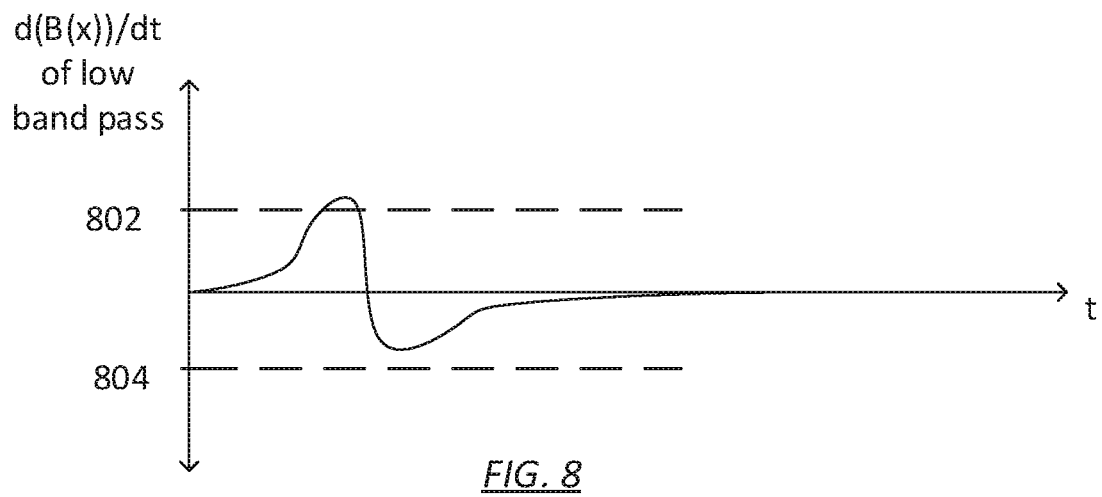
FIG. 8 is a graph showing a low frequency portion of the differential of FIG. 7, compared with thresholds, according to one or more embodiments of the invention.
Figure 9:
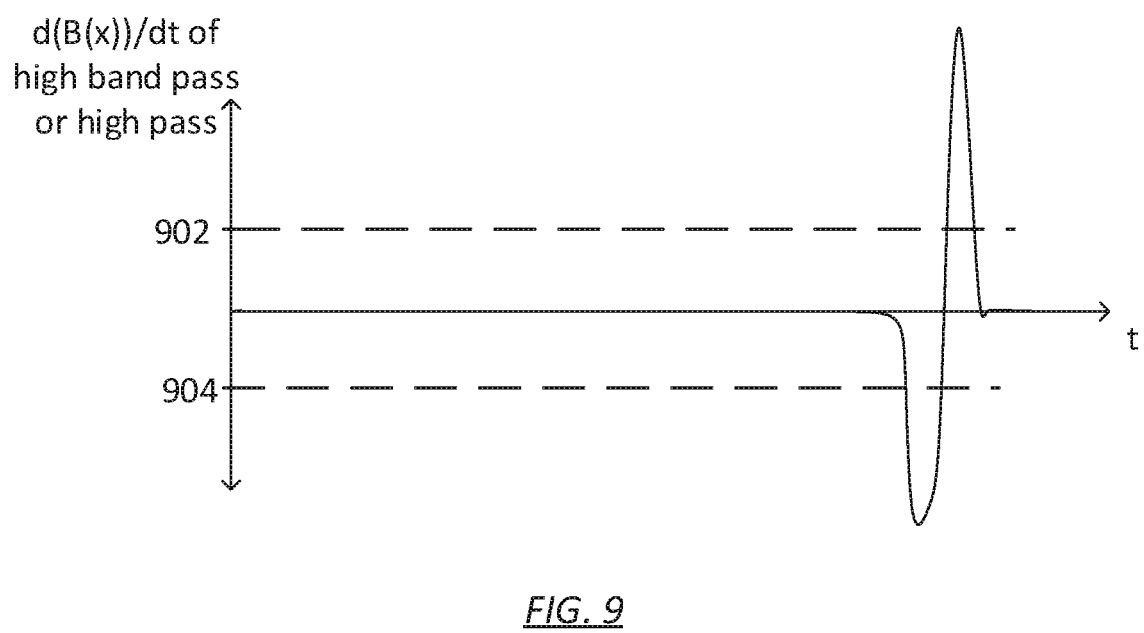
FIG. 9 is a graph showing a high frequency portion of the differential of FIG. 7, compared with thresholds, according to one or more embodiments of the invention.

Though it may be considered that measuring a magnitude of a frequency component of a changing magnitude field is analogous with assessing a rate of change of the magnetic field, FIGS. 7 to 10 illustrate embodiments in which an actual rate of change of the magnetic field is directly assessed. In FIG. 7 shows, in the bottom of the figure, a conceptual/approximate representation of a rate of change of a magnetic field shown in the top of the picture, which is a reproduction of the magnetic field shown in FIG. 3.

The differentiated magnetic field (i.e. its rate of change), $d(B(x))/dt$, is compared with positive and negative thresholds 702 and 704 respectively. As a result, time periods 706, 708 and 710 are detected as change of magnetic states.

FIGS. 8 and 9 show the differentiated magnetic field of FIG. 7 separated into low and high frequency components, respectively. Each of the frequency components is compared with positive thresholds 802, 902 and negative thresholds 804, 904. The positive threshold for a given frequency component may be of the same or different magnitude to the negative threshold for the same frequency component. Further the thresholds may be different for the different frequency components to allow for different detection sensitivities for different frequencies of magnetic change.

Figure 10:
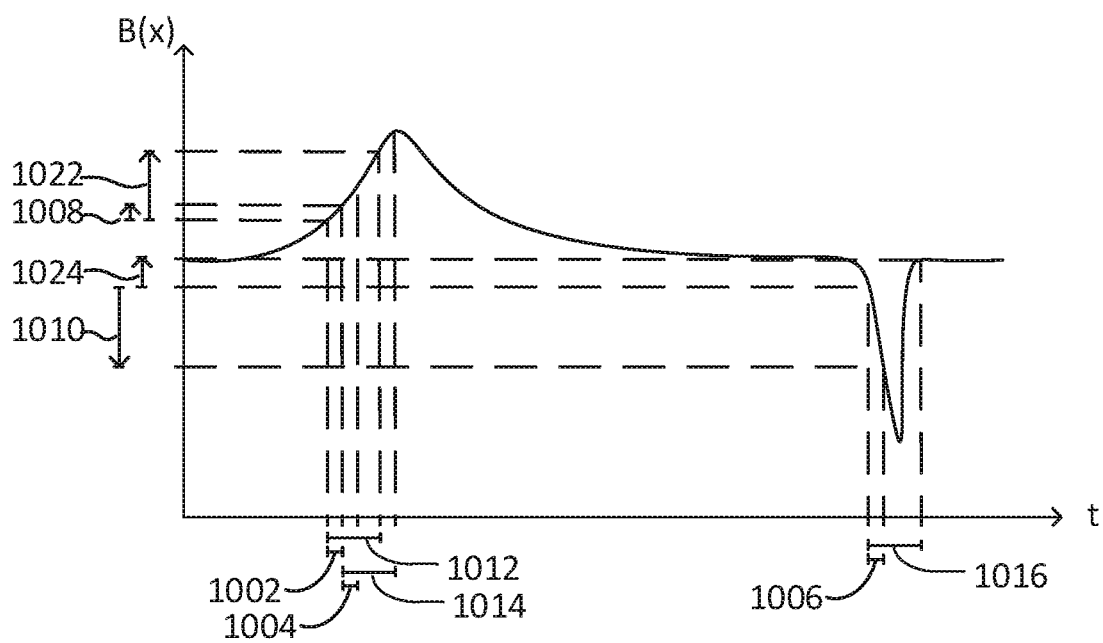
FIG. 10 is a graph showing changes in the sensed magnetic field of FIG. 3 over different durations of time, according to one or more embodiments of the invention.

In another embodiment, illustrated in FIG. 10, rates of change are also assessed, but rather than by performing continuous differentiating of the magnetic field, the identification of relatively slow and relatively fast rates of change are determined discretely by comparing amounts of magnetic field change over relatively long and relatively short durations, respectively. In the figure, a first, relatively short time duration occurs at time interval 1002, and at contiguous times before and afterwards, such as at time interval 1004, and at a later time 1006. The amount of change of the sensed magnetic field over times 1002 and 1006 are indicated by the amounts 1008 and 1010, respectively. The amount of the change 1008 and 1010 with respect to the short duration changes in time is shown in FIG. 11 in comparison with positive and negative thresholds 1102 and 1104, respectively. The change 1008 is a positive change but is less than the positive threshold 1102, whereas the change 1010 is a negative change that is greater (in terms of magnitude) than the negative threshold 1104. As a result, a change of state is only indicated for the change 1010.

In this exemplary embodiment, changes in the sensed magnetic field are also be assessed over longer time durations, such as during time interval 1012, 1014 and 1016, to give an indication of slower changes in magnetic field. The changes in magnetic field corresponding to intervals 1012 and 1016 are indicated by changes 1022 and 1024, respectively. FIG. 12 shows the changes 1022 and 1024 in comparison with positive and negative thresholds 1202 and 1204, respectively, for the longer duration measurements. In this example, only the change 1202 is greater than the threshold, so only that change may result in an indication of a change of state.

Figure 11:
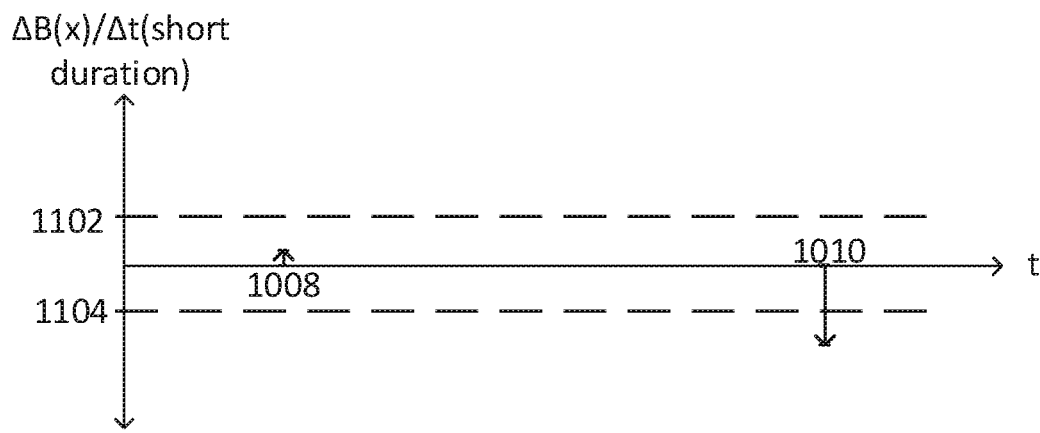
FIG. 11 is a graph showing the changes in the sensed magnetic field from FIG. 10 for relatively short durations of time, compared with thresholds, according to one or more embodiments of the invention.
Figure 12:
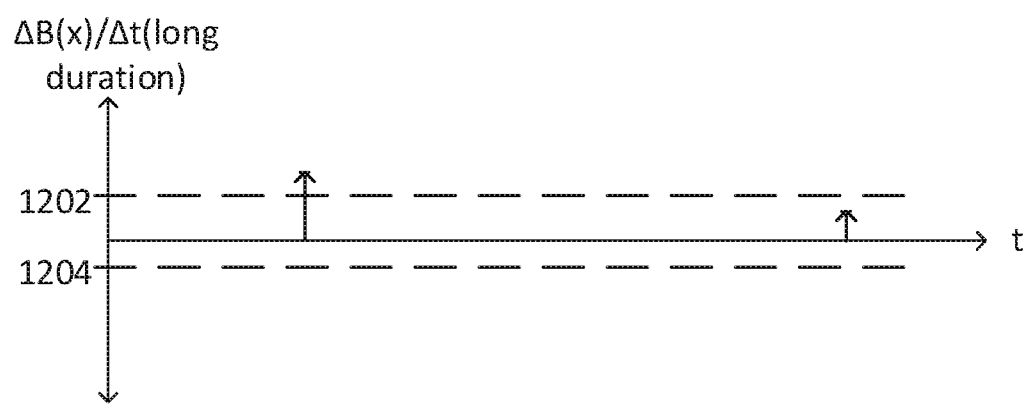
FIG. 12 is a graph showing the changes in the sensed magnetic field from FIG. 10 for relatively long durations of time, compared with thresholds, according to one or more embodiments of the invention.

Optionally in the embodiment of FIGS. 10 to 12, the outputs of the comparisons with the threshold may be processed to require a predefined plurality of successive comparator outputs (i.e. over successive time intervals) to be the same, in order to reduce noise and/or misleading results. For example, outputting an indication of a change of state may require a predefined plurality (e.g. 2 in some embodiments) of successive changes that are greater than the positive threshold or a plurality of successive changes greater (in magnitude) than the negative threshold.

In some embodiments, the processing component is further configured to also detect a change of condition at the access point when the indication of the sensed magnetic field is greater than any one of a plurality of thresholds, wherein a plurality of said thresholds lie in different axes that are orthogonal to each other.

Thus, regardless of whether a potential intruder is able to evade detection of a tamper magnet based on a dynamic quality of the sensed magnetic field (for example by moving the magnet with a speed outside a range of detectable speeds), the processing component is able to detect a change in state based on an increase in the absolute value of the sensed magnetic field. Such detection may, however, optionally use pre-set thresholds rather than thresholds set at installation. Although greater sensitivity may be achieved by calibrating the thresholds for a particular installation, sensitivity to a tamper magnet may nonetheless be achieved with pre-set thresholds due to the use of comparison thresholds in a plurality of orthogonal axes, and/or due to the pre-set-thresholds only being needed to provide a form of redundancy or back-up should a potential intruder be able to avoid sensing of the dynamic quality of the magnetic field.

In many installations, however, a vast majority of the sensed magnetic field will lie in one direction of one the axes, which may be pre-known or determined by a measurement at installation. Thus, in some embodiments, a larger threshold may advantageously be used for one of the axes than the other axes. In some embodiments, the larger threshold may be used for only one direction of said one of the axes. Optionally the threshold in an opposite direction to the one direction may be zero. For example, if the majority of the magnetic field is known to lie in the +X axis, then any negative value for X may be determined as a change of state.

In some embodiments, the plurality of thresholds comprises six thresholds, wherein said plurality of said thresholds lie in three different axes that are orthogonal to each other. Thus, there may for example by thresholds in +x, −x, +y, y, +z or −z axes, one of which may optionally be zero.

Figure 13:
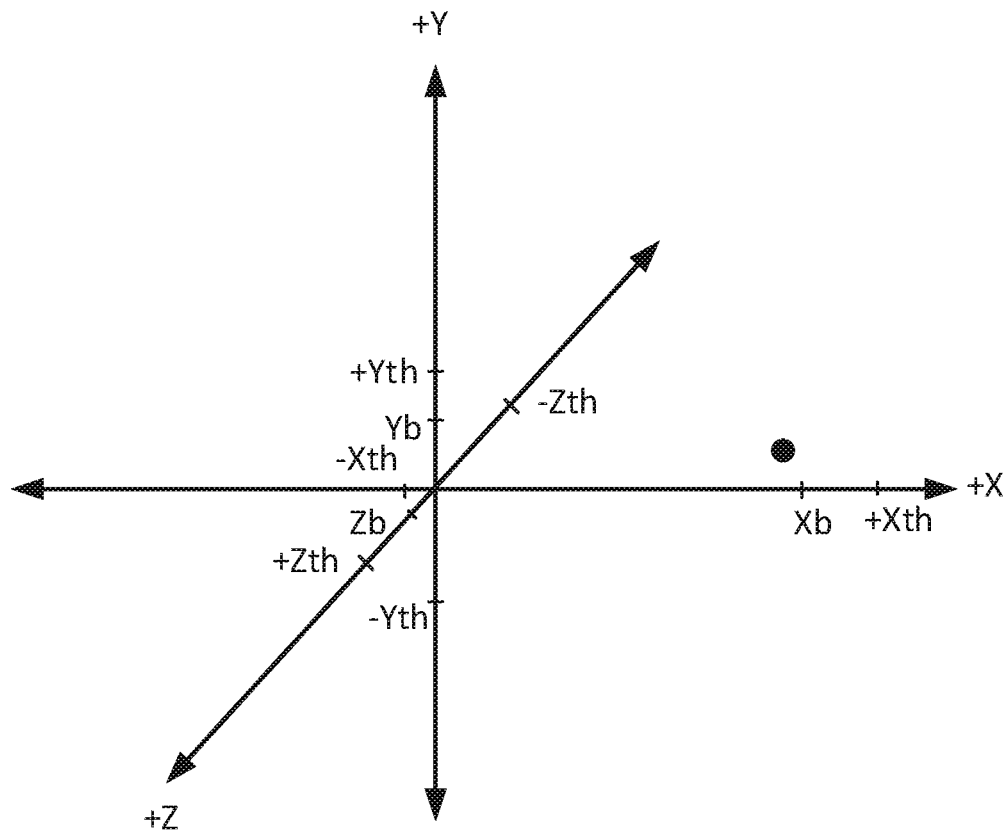
FIG. 13 is a three-dimensional representation of a bias of a sensed magnetic field and various thresholds used for comparison with the sensed magnetic field, according to one or more embodiments of the invention.

For example, turning to FIG. 13, the bias of a sensed magnetic field, i.e. the field in a non-tampered closed accessed point, may three dimensional coordinates Xb, Yb, Zb. However, Xb is much larger than Yb and Zb. Yb and Zb are relatively small such that they are less than pre-defined thresholds +Yth, −Yth and +Zth, −Zth, respectively. A factory set threshold may be used for +Xth, For example +Xth can be set to a measured value of the magnetic field when the first part 106 and second part 108 are touching with the magnetic field aligned in the +X direction, since in use the first part 106 and second part may be installed with at least some separation between them and therefore a lower magnetic field than the factory measurement. Optionally +Xth may in any case be slightly larger than that measured value. The threshold for −Xth may be zero or a non-zero value.

Nonetheless, the present invention is still advantageous even if is calibration is performed to set one or more of +Xth, −Xth, +Yth, −Yth, +Zth, or −Zth, which is optional in some embodiments, as at least because detecting of a dynamic quality of the sensed magnetic field enables some adaptation to any reductions in the bias magnetic field over time, and in any case provides another mode of detecting magnetically significant events.

The meaning of "first" and "second", as used herein, is not intended to imply a temporal ordering in which the first must precede the second.

Where a given item is referenced herein with the preposition "a" or "an", it is not intended to exclude the possibility of additional instances of such an item, unless context requires otherwise.

Where the specification defines a range, the stated outer extremities of the range are part of the range, unless context requires exclusion of the outer extremities from the range. For example, a range defined in terms of being between X and Y or from X to Y, should be interpreted as including X and Y.

The present invention also provides a storage medium storing processor implementable code, which, when executed by a processing system, implement the processes of any of the embodiments described above.

In one embodiment, the storage medium, can comprise a non-transient storage medium storing code for execution by a processor of a machine to carry out the method. Embodiments can be implemented in programmable digital logic that implements computer code. The code can be supplied to the programmable logic, such as a processor, microprocessor or processing system, on a carrier medium. One embodiment is a non-transitory storage medium that stores the code, such as a solid-state memory, magnetic media (hard disk drive), or optical media (Compact disc (CD) or digital versatile disc (DVD)).

As used herein, except where the context requires otherwise, the terms "comprises", "includes", "has", and grammatical variants of these terms, are not intended to be exhaustive. They are intended to allow for the possibility of further additives, components, integers or steps.

The invention disclosed and defined herein extends to all plausible combinations of two or more of the individual features mentioned or evident from the text or drawings. All of these different combinations constitute various alternative aspects of the invention.

The invention claimed is:

1. A device for monitoring an entry to or exit from a space via an access point, the access point having a first component and a second component that are separable from each other to create an opening for the entry or exit, the device comprising:
 a first part for mounting to one of first component and the second component, the first part having:
  a sensing component for sensing in multiple dimensions a magnetic field emanating from a second part mounted on the other of the first component and the second component; and
 a processing component configured to:
  receive an indication of the sensed magnetic field;
  detect a change of condition at the access point when a dynamic quality of the indication of the sensed magnetic field satisfies a predefined criterion; and
  output an indication of the detected change of condition;
 wherein the processing component is configured to detect a change of condition at the access point, by:
  performing a first comparison involving a first value representing a first rate of change that represents an amount of change of the sensed magnetic field over a first duration of time, the first comparison being of the first value with respect to a first threshold;
  performing a second comparison involving a second value representing a second rate of change that represents an amount of change of the sensed magnetic field over a second duration of time that is different to the first duration of time, the second comparison being of the second value with respect to a second threshold; and
  detecting a change of condition at the access point when at least one of the first value is greater than the first threshold and the second value is greater than the second threshold.

2. The device according to claim 1, wherein the first and second thresholds are different from each other.

3. The device according to claim 1, wherein the first threshold has a same magnitude as the second threshold.

4. The device according to claim 1, wherein the sensing component is a solid-state magnetometer, wherein the indication of the magnetic field is in multiple dimensions.

5. The device according to claim 1, wherein the sensing component is a solid-state magnetometer, wherein the indication of the magnetic field comprises a three-dimensional representation of the sensed magnetic field.

6. The device according to claim 1, wherein the processing component is further configured to also detect a change of condition at the access point when the indication of the sensed magnetic field is greater than any of the first and second thresholds, wherein said first and second thresholds lie in different axes that are orthogonal to each other.

7. The device according to claim 6, wherein one of said thresholds has a larger magnitude than the other of said thresholds.

8. A method for monitoring an entry to or exit from a space via an access point, the access point having a first component and a second component that are separable from each other to create an opening for the entry or exit, wherein a first part is mounted to one of the first component and the second component, the first part having a sensing component for sensing in multiple dimensions a magnetic field emanating from a second part mounted on the other of the first component and the second component, wherein the method comprises:
  receiving an indication of the sensed magnetic field;
  detecting a change of condition at the access point when a dynamic quality of the indication of the sensed magnetic field satisfies a predefined criterion; and
  outputting an indication of the detected change of condition;
  wherein detecting a change of condition at the access point comprises:
    performing a first comparison involving a first value representing a first rate of change that represents an amount of change of the sensed magnetic field over a first duration of time, the first comparison being of the first value with respect to a first threshold;
    performing a second comparison involving a second value representing a second rate of change that represents an amount of change of the sensed magnetic field over a second duration of time that is different to the first duration of time, the second comparison being of the second value with respect to a second threshold; and
    detecting a change of condition at the access point when at least one of the first value is greater than the first threshold and the second value is greater than the second threshold.

9. The method according to claim 8, wherein the first and second thresholds are different to each other.

10. The method according to claim 8, wherein the first threshold has a same magnitude as the second threshold.

11. The method according to claim 8, wherein the sensing component is a solid-state magnetometer, wherein the indication of the magnetic field is in multiple dimensions.

12. The method according to claim 8, wherein the sensing component is a solid-state magnetometer, wherein the indication of the magnetic field comprises a three-dimensional representation of the sensed magnetic field.

13. The method according to claim 8, further comprising:
  detecting a change of condition at the access point when the indication of the sensed magnetic field is greater than any of the first and second thresholds, wherein said first and second thresholds lie in different axes that are orthogonal to each other.

14. The method according to claim 13, wherein one of said thresholds has a larger magnitude than the other of said thresholds.

15. A carrier medium carrying code for execution by a processing system, wherein upon executing the code, the processing system is configured to perform operations comprising:
  monitoring an entry to or exit from a space via an access point, the access point having a first component and a second component that are separable from each other to create an opening for the entry or exit, wherein a first part is mounted to one of the first component and the second component, the first part having a sensing component for sensing in multiple dimensions a magnetic field emanating from a second part mounted on the other of the first component and the second component, wherein monitoring the entry to or exit from the space via the access point comprises:
    receiving an indication of the sensed magnetic field;
    detecting a change of condition at the access point when a dynamic quality of the indication of the sensed magnetic field satisfies a predefined criterion; and
    outputting an indication of the detected change of condition;
    wherein detecting a change of condition at the access point comprises:
      performing a first comparison involving a first value representing a first rate of change that represents an amount of change of the sensed magnetic field over a first duration of time, the first comparison being of the first value with respect to a first threshold;
      performing a second comparison involving a second value representing a second rate of change that represents an amount of change of the sensed magnetic field over a second duration of time that is different to the first duration of time, the second comparison being of the second value with respect to a second threshold; and
      detecting a change of condition at the access point when at least one of the first value is greater than the first threshold and the second value is greater than the second threshold.

16. The carrier medium according to claim 15, wherein the first and second thresholds are different to each other.

17. The carrier medium according to claim 15, wherein the first threshold has a same magnitude as the second threshold.

18. The carrier medium according to claim 15, wherein the sensing component is a solid-state magnetometer, wherein the indication of the magnetic field is in multiple dimensions.

19. The carrier medium according to claim 15, wherein the sensing component is a solid-state magnetometer, wherein the indication of the magnetic field comprises a three-dimensional representation of the sensed magnetic field.

20. The carrier medium according to claim 19, wherein the operations further comprise:
  detecting a change of condition at the access point when the indication of the sensed magnetic field is greater than any of the first and second thresholds, wherein said first and second thresholds lie in different axes that are orthogonal to each other, and wherein one of said thresholds has a larger magnitude than the other of said thresholds.

* * * * *